3,093,912
TEACHING DEVICE
John H. Beauvais, 20 Healey St., Cambridge, Mass.
Filed June 1, 1961, Ser. No. 114,117
1 Claim. (Cl. 35—8)

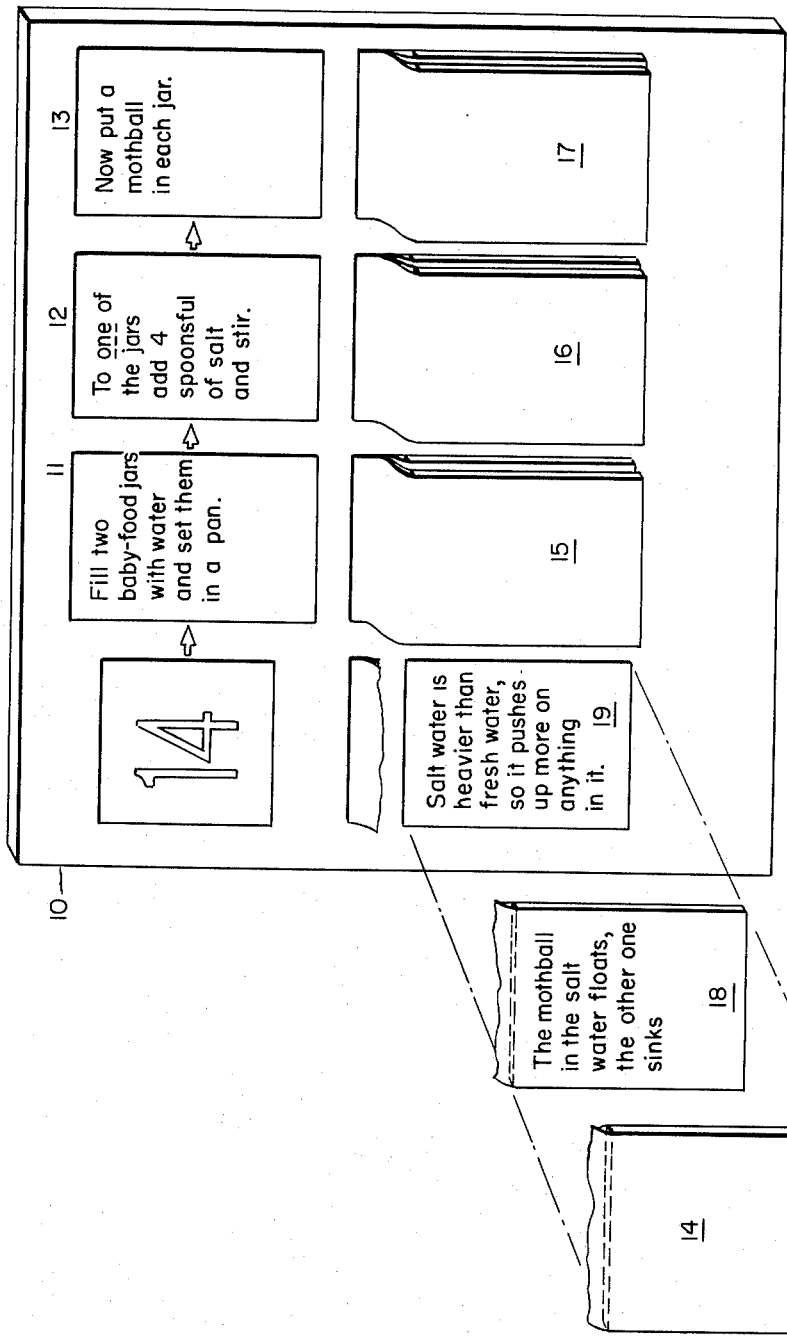

This invention comprises a new and improved teaching device which has a particularly useful field in the teaching of science to young children in the lower grades.

In a preferred form the device comprises a base member of cardboard or the like having a number of areas set off thereon presenting procedural instructions for carrying out simple experiments of a scientific character, and also a series of groups each including a cover hinged at one edge or otherwise connected to the base member and enclosing a hinged intermediate sheet or leaf on which is displayed a statement of facts to be observed from following the instructions, and finally an area on the base presenting an explanatory statement temporarily concealed by the intermediate leaf.

The teaching device of my invention is employed as a part of a pupil-operated, portable, equipped and ready to use, elementary school science laboratory. The pupils set up the experiments as directed by the teaching device, carry them out, visually observe the results and are almost inescapably exposed to the knowledge and learning that is forcibly demonstrated to them as a result of their own manipulation.

The teaching device herein disclosed is the essential component of what may be termed a basic laboratory because its organized accountability controls and organized traffic controls enable even a non-scientific teacher without preparation to conduct a class in which each child is actually doing experiments, observing relationships and keeping an individual record of his progress. Because it teaches basic relationships of scientific phenomena common to all sciences it can be used as a curriculum by itself or to accompany any elementary science text.

These and other features of the invention will be best understood and appreciated from the following description of a preferred embodiment thereof selected for purposes of illustration and shown in the accompanying drawings in which:

The FIGURE is a plan view of the device with the elements of one unit shown in exploded relation.

The base member 10 may be of cardboard, plywood or other stiff sheet material. It is shown as carrying an index number 14 and may be assumed to be one of a set of twenty-five. Upon the upper half of the base member are set out three areas 11, 12 and 13 separated by open space and presenting progressive procedural instructions for one experiment with arrows indicating the direction of progression. In the present instance the experiment consists in filling two jars with water, adding four teaspoons of salt to one of the jars and stirring and finally putting a moth ball in each jar.

The lower half of the base has a series of unit groups with covers 14, 15, 16 and 17 each hinged to the base at its upper edge. Under the cover 14 of the first unit is a hinged intermediate sheet 18 on which is displayed a statement of the facts observed from following the instructions given by the areas 11, 12 and 13. In this instance the intermediate sheet 18 points out that the moth ball in the salt water floats and the other one sinks. Beneath the intermediate sheet 18 is an area 19 presenting an explanatory statement. In this instance the statement is that salt water is heavier than fresh water so it pushes up more on anything in it, a statement explaining why the moth ball floats in salt water and sinks in fresh water.

The units 15, 16 and 17 are directed to other facts that may be observed from the experiments defined in the areas 11, 12 and 13, as for example that the salt water is milky colored because the undissolved salt reflects light or that the salt water clears as the salt dissolves or as the undissolved salt settles to the bottom of the jar.

In using a teaching device of the character above described the teacher may assign pupils to work with partners who are told first to read the instructions at the top of the device, find the equipment needed and arrange it on their desk. While one partner reads the instructions aloud the other partner does the experiment. Once the experiment is under way the reader recites to his partner the statement of facts to be observed as displayed by the intermediate sheet 18 making sure that both he and his partner understand it. He then reads the final explanatory statement on the area 19 of the card and again the partners are interested to assure each other and themselves that they understand what they have seen and the reason for it. After completing the first unit group the partners proceed to inspect and digest the contents of the units 15, 16 and 17.

The partners may now change places and the one who read first now does the experiment while the pupil who first did the experiment reads through the sheets aloud making sure that his partner notices and understands as he goes from one unit to the next. They may use the same materials to try doing the experiments in different ways from the instructions on the base, or they may wish to try some materials and equipment that are suggested on the base before going to another numbered device.

It will, of course, be understood that the whole field of elementary science may be comprehended within the scope and capabilities of the devices herein disclosed and claimed. Simple experiments in optics, magnetism, acoustics, etc. lend themselves readily to statement and analysis along lines similar to those above suggested.

Having thus disclosed my invention and described in detail an illustrative embodiment thereof, I claim as new and desire to secure by Letters Patent:

A science teaching device comprising a stiff rectangular base member having two horizontal rows of areas individually set off therein and separated by open space, the areas of the upper row presenting to view progressive procedural instructions comprising the steps for performing a scientific experiment and arrows between the instruction areas indicating the sequence in which the steps should be followed out, and the lower row of areas comprising unit groups each including a blank cover hinged at one edge to the base member, a hinged intermediate sheet enclosed beneath and initially concealed by the cover and displaying a statement of results observed from following the said instructions, and an area on the base member concealed by the cover and intermediate sheet presenting an explanatory statement of the observed results.

References Cited in the file of this patent
UNITED STATES PATENTS

| | | |
|---|---|---|
| 2,199,497 | Jondreau | May 7, 1940 |
| 2,902,775 | Arrowsmith | Sept. 8, 1959 |

FOREIGN PATENTS

| | | |
|---|---|---|
| 759,024 | France | Nov. 7, 1933 |